June 8, 1926.
J. P. NEILSON, SR
1,588,138
PITMAN
Filed May 16, 1925    2 Sheets-Sheet 1
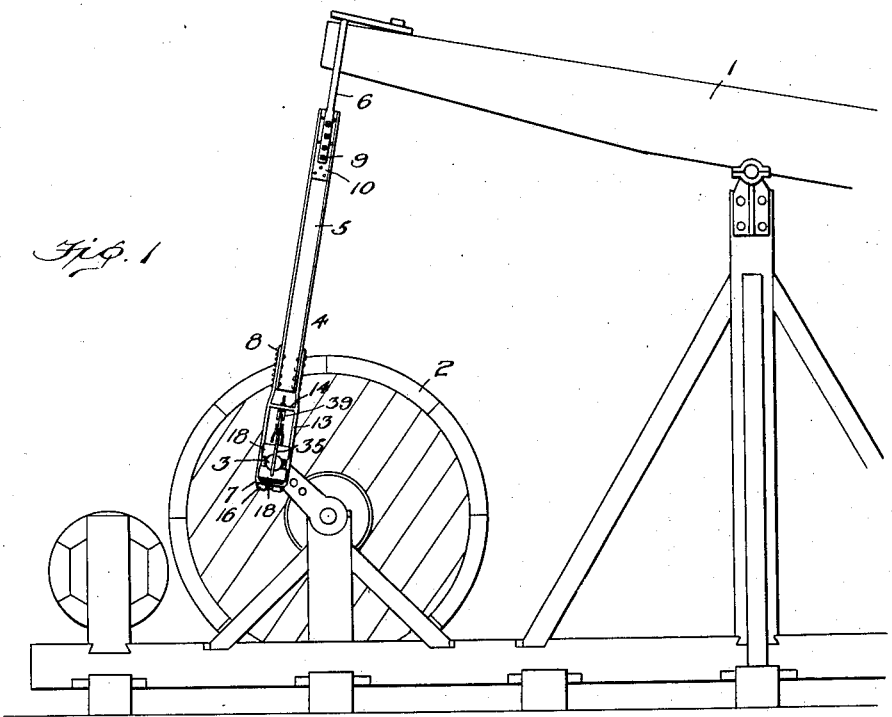
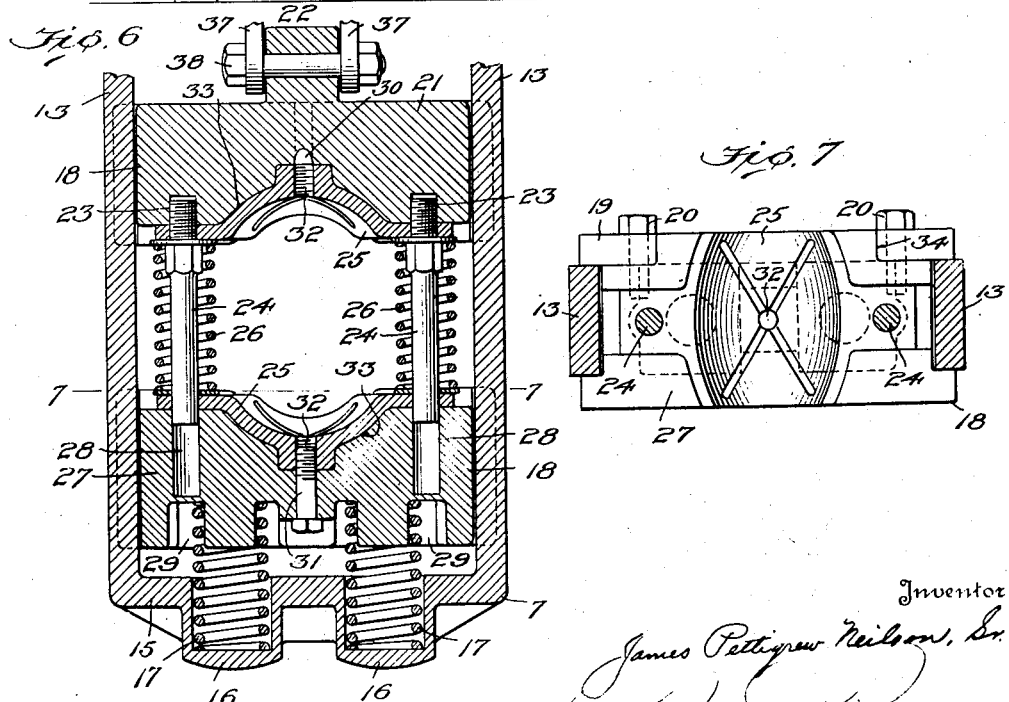

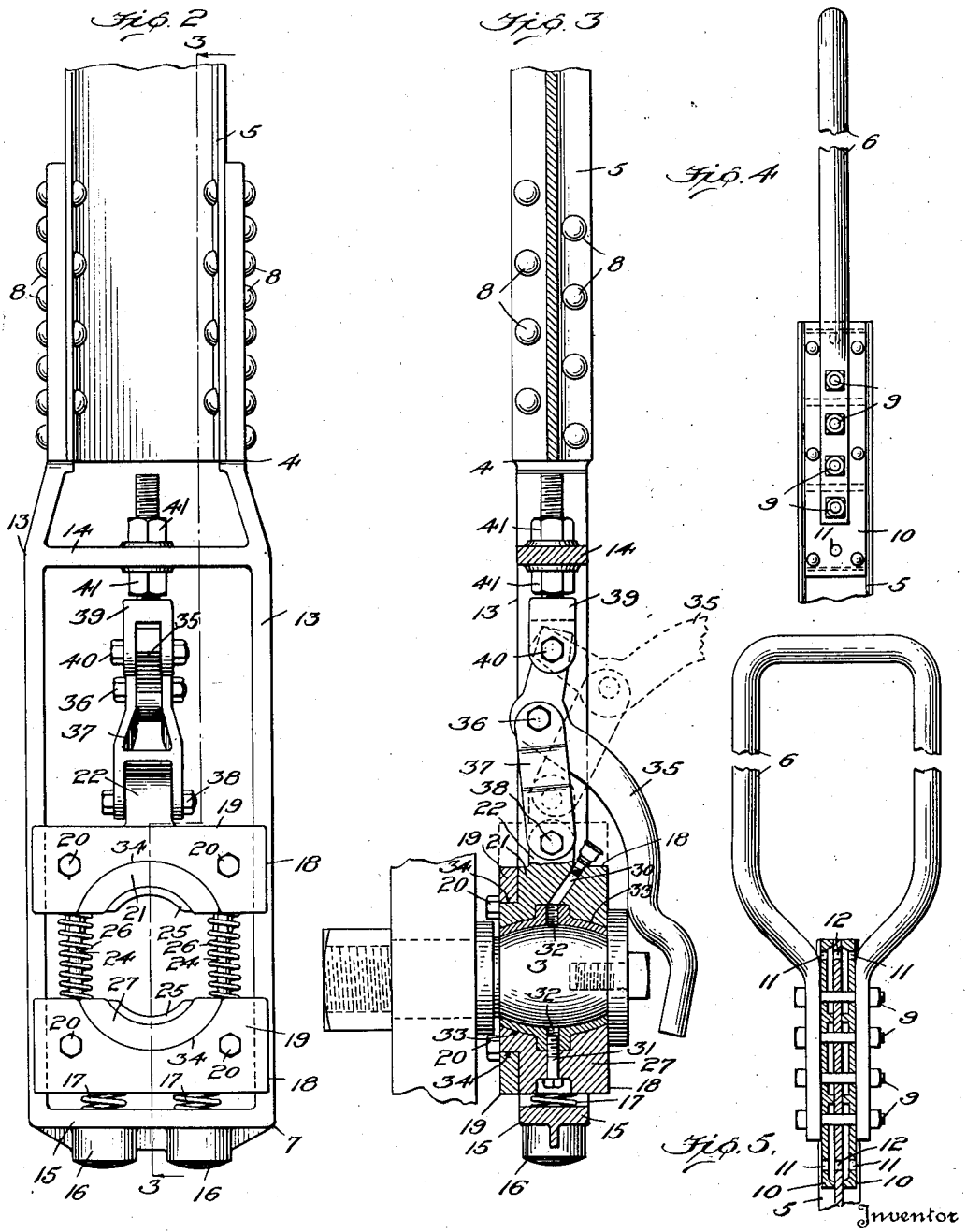

Patented June 8, 1926.

1,588,138

UNITED STATES PATENT OFFICE.

JAMES PETTIGREW NEILSON, SR., OF TULSA, OKLAHOMA.

PITMAN.

Application filed May 16, 1925. Serial No. 30,751.

My invention relates to a pitman which is especially suitable for operatively connecting the walking beam and band wheel wrist pin of a standard drilling rig for oil wells.

The principal object of the invention is to provide a simple, rugged and efficient pitman whose wrist pin bearings may be renewed with a minimum of time and labor and which may be quickly associated with or disengaged from the wrist pin and walking beam of the drilling rig as occasion may require in the course of drilling operations.

A principal feature of the invention consists in forming the pitman with a yoke in which a plurality of relatively movable wrist pin bearing members are slidably mounted, spring means being interposed between the yoke and one of the bearing members, and means being operatively interposed between the other bearing member and the yoke for retaining the pitman in operative relation to the wrist pin of the band wheel.

A further feature of the invention consists in forming the pitman with a yoke within which a plurality of opposed wrist pin bearing devices are mounted, and in interposing between the yoke and one of the bearing devices means movable at will for causing said bearing devices either to be brought into operative relation with the wrist pin of the band wheel or to be released therefrom, each of the said bearing devices involving a plurality of detachably connected members between which portions of the yoke are embraced.

Another feature of the invention consists in mounting within the pitman yoke a plurality of relatively movable wrist pin bearing devices adapted to receive the wrist pin between them, each of said devices involving a recessed block, a removable wrist pin bearing member fitting into the recess of said block, and means for retaining said block in assembled relation to the yoke, and releasable means being operatively interposed between the yoke and one of the bearing devices for actuating the latter to force it into operative relation with the band wheel wrist pin.

A still further feature of the invention consists in forming the pitman with a yoke in which a plurality of relatively movable wrist pin bearing devices are mounted, and in providing toggle means for moving one of said bearing devices with respect to the other, the said toggle means involving a bent lever, an integral link bifurcated to receive the lever and pivotally connected to the latter and to the adjacent bearing device, and an adjustable clevis bolt whose bifurcated head receives and is pivotally connected to said lever.

Other features of the invention pertaining to advantageous forms and relations of parts will hereinafter appear.

In the drawings illustrating a preferred embodiment of the invention, the scope whereof is pointed out in the claims,—

Figure 1 is an elevational view of a portion of a so-called standard rig for drilling oil wells, illustrating the operative relation of the pitman to the walking beam and to the wrist pin of the band wheel.

Figure 2 is an elevational view of the wrist pin engaging end of the pitman, the wrist pin bearings being shown in the separated relation occupied by them when the pitman is being applied to or released from the wrist pin.

Figure 3 is a sectional view on the line 3—3, Fig. 2, showing a portion of the band wheel wrist pin and illustrating the pitman bearings in working relation thereto.

Figure 4 is a detail elevational view of the upper or walking beam engaging end of the pitman.

Figure 5 is a detail view partly in elevation and partly in section of the portion of the pitman illustrated in Fig. 4.

Figure 6 is a detail sectional view of the lower portion of the pitman, the view being taken in a plane at right angles to the axis of the wrist pin.

Figure 7 is a sectional view on the line 7—7, Fig. 6.

In the drawings 1 indicates the walking beam, 2 is the band wheel, and 3 is the band wheel wrist pin of a standard or cable-tools rig commonly employed for drilling oil or other deep wells. The band wheel, which is belt driven from the engine (not shown) operates the walking beam through the intervention of a pitman 4 forming an operative connection between said walking beam and the wrist pin 3. The various operations necessary to be performed in sinking a well necessitate frequent disconnection of the pitman in order that the band wheel 2 may rotate without actuating the walking beam. It is therefore advantageous to construct the pitman in such manner that it may be conveniently disconnected with a minimum loss of time, but this desirable result must be attained without impairing the efficiency and reliability of the pitman in service.

The pitman 4 is preferably constructed with an intermediate bar member 5 to the upper end of which is secured a stirrup 6 and to the lower end of which is attached a yoke 7, preferably by means of rivets 8. The pitman member 5 may advantageously be formed as an eye beam section through the flanges of which the rivets 8 extend. The stirrup 6, which constitutes means for operatively connecting the pitman to the walking beam, may be of the well known form employed for this purpose. It is preferably secured to the upper end of the pitman bar 5 by means of bolts 9 which pass through the web of the said bar and through filler members 10 interposed between the stirrup and the member 5 on opposite sides of the web of the latter. To allow for increasing or decreasing the length of the pitman as may be desired, the filler members 10 which space the stirrup from the web of the bar member 5 are provided with additional bolt holes 11 which register with corresponding additional bolt holes 12 in the web of the pitman bar.

The yoke 7 is most advantageously formed as an integral steel casting having parallel side bars 13 which are rigidly united by an upper tie bar 14 and a lower tie bar 15 spaced from the latter. The lower bar 15 is preferably formed with a plurality of spring pockets 16 for receiving the springs 17 which are preferably interposed between the yoke and lower wrist pin bearing carried by said yoke. These springs serve to cushion the strains induced during an upstroke of the pitman.

Mounted in spaced relation between the arms of the yoke are a plurality of opposed wrist pin bearing devices 18 which are adapted to receive the wrist pin 3 between them. Each of said bearing devices involves a plurality of detachably connected members embracing the yoke arms 13 so as to retain these parts in assembled relation while permitting the bearing devices to be capable of relative movement with respect to each other and to the yoke in which they are mounted. The yoke engaging members of the wrist pin bearing devices are detachably connected and preferably comprise, in each instance, a recessed bearing block to which a plate member 19 is secured by means of bolts 20. The recessed block 21 of the upper bearing is preferably provided with a centrally disposed perforated lug 22 to permit the pivotal attachment of toggle means for sliding the upper wrist pin bearing in the yoke as may be necessary either to bring the bearings into operative relation to the wrist pin or to release them therefrom. The bearing block 21 is also preferably provided with threaded recesses 23 for receiving the correspondingly threaded upper ends of shouldered stud guide pins 24 serving to maintain the wrist pin bearing members 25 in proper relation to the respective recessed blocks in which they fit. Springs 26 which respectively encircle the pins 24 and are interposed between the wrist pin bearing members 25 operate to force the pin bearing members apart and maintain them in separated relation when the toggle mechanism is actuated to permit the pitman to be disengaged from the wrist pin 3.

The recessed block 27 of the lower bearing device is provided with suitable chambers 28 for receiving and guiding the pins 24 and is fashioned as at 29 to receive and form seats for the upper ends of the cushioning springs 17. If desired, and as is preferred, the block 21 may be provided with a lubricating passage 30 which communicates with the opening 32 extending through the adjacent bearing member 25 which engages the wrist pin. Lubricant may be supplied to the passage 30 in any convenient manner, as for example by means of a grease cup. In order that the bearings 25 may be interchangeable, an opening 32 is provided in each of them, said openings being threaded so that the bearing positioned below the wrist pin may be held in place by a tap screw 31 which extends through the lower block 27 of the bearing device.

The bearing members 25 which engage the wrist pin are preferably identical in form in all respects. In the present instance, and as is preferred, the bearing surfaces are curved so as to conform to a wrist pin of the oval type. As shown, the recesses 33 with which the blocks 21 and 27 are respectively provided for receiving the bearing members 25 are shouldered to correspond to said bearing members 25 so that the latter are effectively maintained against shifting. Each of the members 25 preferably bears wholly against its neighboring block, instead of imposing a portion of the thrust of the wrist pin on the detachable plate 19 associated with the block. To this end the plates 19 are cut away as indicated at 34 to permit a portion of each of the respective blocks 21 and 27 to intervene between the plates 19 and the bearing members 25 associated therewith.

The upper wrist pin bearing device 18 is designed to be moved toward and from the opposed bearing device so as to permit the wrist pin to be engaged with and released from said bearing devices at will. The means employed for this purpose constitutes a toggle mechanism which is interposed between the upper transverse bar 14 of the yoke and the adjacent bearing device. It involves a bent operating lever or handle 35 which is pivotally connected by means of a bolt 36 to an integral link 37. The lower end of the link is bifurcated to receive the perforated lug 22 of the bearing block 21 and is pivotally connected thereto by means of a bolt 38, while the upper end of the said link is also preferably bifurcated so as to embrace the lever 35. The upper end of the lever is received between the jaws of a clevis bolt 39 to which it is pivotally attached by a bolt 40. The upper end of the clevis bolt, which passes through the transversely extending bar 14 of the yoke, is threaded for the reception of two nuts 41 which are disposed upon opposite sides of said bar. By this means the toggle mechanism is supported by the yoke in a manner enabling it to be adjusted so as to cause the wrist pin bearing devices to assume proper operative relation to the wrist pin when the lever 35 is manipulated to move the upper bearing device downwardly in the yoke. As shown in Fig. 3, the construction is such that when the lever 35 is actuated to force the upper bearing member into operative position, the pivot pin 36 passes somewhat beyond the line connecting the pivotal points 38 and 40, thus enabling the toggle mechanism to operate as a lock for maintaining the bearing devices in operating relation to the wrist pin 3. The position which the lever 35 assumes when the pitman is to be released from the wrist pin is illustrated in dotted lines in Fig. 3.

It will be perceived that a pitman involving the invention may be constructed of comparatively few and simple parts, that it may be readily brought into operative relation with the wrist pin and walking beam and as readily disengaged therefrom, and that the renewal of bearings for the wrist pin may be effected with a minimum of labor and without the destruction of any parts.

I claim:—

1. A pitman for operatively connecting the wrist pin and walking beam of a drilling rig, said pitman being provided at one end with a yoke, and having a plurality of relatively movable wrist pin bearing members slidably mounted on said yoke and adapted to receive the wrist pin between them, and embodying spring means interposed between said yoke and one of said bearing members, and also embodying means cooperating with the other bearing member and with said yoke for releasably retaining said last named bearing member in operative relation to said wrist pin.

2. A pitman for operatively connecting the wrist pin and walking beam of a drilling rig, said pitman embodying a yoke, a plurality of opposed wrist pin bearing devices mounted within said yoke and adapted to receive the wrist pin between them, and movable means operatively interposed between said yoke and one of said bearing devices for effecting relative movement of said bearing devices permitting said wrist pin to be engaged with and released from said bearing devices at will, said movable means when in one position serving to maintain one of said bearing devices in operative relation to the wrist pin, and each of said bearing devices involving a plurality of detachably connected members embracing portions of said yoke between them.

3. A pitman for operatively connecting the wrist pin and walking beam of a drilling rig, said pitman embodying a yoke having spaced arms and a plurality of spaced bars integrally connecting said arms, a plurality of opposed relatively movable wrist pin bearing devices mounted between said yoke arms and bars, and means operatively interposed between one of said bars and the adjacent bearing device for moving the latter toward the opposed bearing device and for maintaining it in position for cooperating with said wrist pin, each of said bearing devices involving a plurality of detachably connected members embracing said yoke arms between them.

4. A pitman for operatively connecting the wrist pin and walking beam of a drilling rig, said pitman embodying a yoke, a plurality of relatively movable wrist pin bearing devices mounted in said yoke, and toggle means for moving one of said bearing devices with respect to the other, said means involving a bent lever, an integral link bifurcated to receive said lever and pivotally connected to said lever and to the adjacent bearing device, and a clevis bolt whose head receives said lever and is pivotally connected thereto, said bolt and yoke being adjustably connected.

5. A pitman for operatively connecting the wrist pin and walking beam of a drilling rig, said pitman embodying a yoke, a plurality of relatively movable wrist pin bearing devices mounted within the yoke and adapted to receive the wrist pin between them, each of said devices involving a recessed block having oppositely extending flanges overlapping said yoke, means detachably secured to said block and overlapping said yoke for retaining said block in assembled relation to said yoke, and a wrist pin bearing member removably mounted on said block and extending into the recess of the latter, and releasable means operatively interposed between said yoke and one of said bearing devices for maintaining the latter in operative relation to said wrist pin.

6. A pitman for operatively connecting the wrist pin and walking beam of a drilling rig, said pitman embodying a yoke, a plurality of relatively movable wrist pin bearing devices mounted within the yoke and adapted to receive the wrist pin between them, each of said devices involving a recessed block provided with oppositely extending members overlapping said yoke, means for retaining said block in assembled relation to said yoke, and a removable wrist pin bearing member fitting into the recess of said block, said recess and bearing member having interengaging shoulders, releasable means operatively interposed between said yoke and one of said bearing devices for actuating the latter and maintaining it in operative relation to said wrist pin, and spring means interposed between said bearing devices, said spring means being adapted to cause a separation of said bearing devices to release said wrist pin.

7. A pitman for operatively connecting the wrist pin and walking beam of a drilling rig, said pitman embodying a yoke having oppositely disposed arms, a plurality of relatively movable wrist pin bearing devices mounted between the arms of said yoke and adapted to receive the wrist pin between them, and releasable means for moving one of said devices with respect to the other so as to cause it to assume and be maintained in operative relation to said wrist pin, each of said bearing devices involving a block having oppositely projecting portions respectively overlapping said yoke arms, detachable means overlapping said yoke arms for retaining said block in assembled relation to said yoke, and a wrist pin bearing member removably mounted on said block and extending into the recess of the latter, said block having a portion projecting between said bearing member and said detachable means and serving to relieve said detachable means from radial thrust imposed on said bearing member by the wrist pin.

In testimony whereof I affix my signature.

JAMES PETTIGREW NEILSON, Sr.